United States Patent [19]

Kosha et al.

[11] Patent Number: 4,740,418

[45] Date of Patent: Apr. 26, 1988

[54] MAGNETIC RECORDING MEDIUM

[75] Inventors: Hideaki Kosha; Takahito Miyoshi, both of Odawara, Japan

[73] Assignee: Fuji Photo Film Co., Ltd., Japan

[21] Appl. No.: 843,973

[22] Filed: Mar. 25, 1986

[30] Foreign Application Priority Data

Mar. 26, 1985 [JP] Japan .................................. 60-62938

[51] Int. Cl.$^4$ ............................................... G11B 5/70
[52] U.S. Cl. ................................. 428/328; 427/128; 428/694; 428/323; 428/900
[58] Field of Search ............... 428/323, 328, 694, 695, 428/900; 427/128

[56] References Cited

U.S. PATENT DOCUMENTS

| | | | |
|---|---|---|---|
| 4,285,825 | 8/1981 | Isobe et al. .................. | 427/128 |
| 4,328,935 | 5/1982 | Steel ............................. | 428/694 |
| 4,399,189 | 8/1983 | Nakashima et al. ......... | 428/694 |
| 4,425,400 | 1/1984 | Yamaguchi et al. ......... | 428/900 |
| 4,455,345 | 6/1984 | Miyatuka et al. ............ | 428/694 |
| 4,591,528 | 5/1986 | Nishimatsu et al. ......... | 427/128 |

Primary Examiner—Paul J. Thibodeau
Attorney, Agent, or Firm—Gerald J. Ferguson, Jr.; Michael P. Hoffman; Michael J. Foycik, Jr.

[57] ABSTRACT

A magnetic recording medium comprising a nonmagnetic support and a magnetic recording layer provided on said support, said magnetic recording layer comprising a ferromagnetic powder dispersed in a binder, characterized in that said magnetic recording layer contains an acicular inorganic powder which has a Mohs' scale of hardness of not less than 5, a length of not longer than 1.0 $\mu$m, a thickness of not thicker than 0.1 $\mu$m, and an aspect ratio in the range of 5 to 20.

5 Claims, No Drawings

MAGNETIC RECORDING MEDIUM

BACKGROUND OF THE INVENTION

1. Field of the Invention

The present invention relates to a magnetic recording medium. More particularly, the invention relates to an improvement of a magnetic recording medium comprising a nonmagnetic support and a magnetic recording layer.

2. Description of Prior Arts

A magnetic recording medium such as an audio-tape, a video-tape, or a recording medium employed in a computer system, basically comprises a nonmagnetic support and a magnetic recording layer provided on the support. The magnetic recording layer comprises a ferromagnetic powder such as a needle crystalline powder of $\gamma$-$Fe_2O_3$, Co-containing ferromagnetic iron oxide, or $CrO_2$ dispersed in a binder. Recently, a demand for high density recording system has increased, and accordingly studies for a magnetic recording medium replacing a ferromagnetic metal powder for the conventional oxide-type ferromagnetic powder have been made.

A ferromagnetic metal powder has been employed as ferromagnetic material of a recording medium for computer system. The ferromagnetic metal powder is high in coercive force (Hc) and residual flux density (Br), and moreover is stable in a wide temperature range. For these reasons, the ferromagnetic metal powder has been paid attention for the use in such magnetic recording media as a video-tape or an audio-tape. The ferromagnetic metal powder is known to afford recording of higher density, as the powder is minimized.

While the ferromagnetic metal powder has excellent characteristics, there is a drawback in that the ferromagnetic metal powder is low in hardness. In more detail, a magnetic recording layer using the metal powder shows poor physical resistance in the running operation, that is, the recording layer is easily scratched or the metal powder is easily dropped off from the layer in the course of running in contact with a magnetic head. These troubles cause the so-called drop-outs. Further, the dropped metal powder is apt to adhere to the surface of the magnetic head to cause clogging on the head. Furthermore, if the recording layer is poor in the physical resistance, the recording layer shows only short still life in the still mode in which a still video image is continuously reproduced.

It is known that the physical resistance of a magnetic recording layer is improved by incorporating a globular abrasive (i.e., hard particles) such as corundum, silicon carbide or chromium oxide in the recording layer. However, the effect of incorporation of an abrasive is shown only where the abrasive is incorporated in a large amount. A magnetic recording layer containing a large amount of an abrasive likely causes extreme abrasion of a magnetic head placed in contact with the running magnetic recording layer. Further, a large amount of the incorporated abrasive is unfavorable to the electromagnetic conversion characteristics of the recording medium. In more detail, the increase of the amount of the abrasive necessarily brings about decrease of the amount of the ferromagnetic powder incorporated in the recording layer. The decrease of the amount of ferromagnetic powder inevitably results in deterioration of the electromagnetic conversion characteristics.

For the above-described reasons, the conventional measure for improving the physical resistance of the magnetic recording layer is not thought to be satisfactory, in view of the resulting characteristics of the magnetic recording medium as well as unfavorable effect given to the magnetic head.

Further, it has been now discovered that the globular abrasive gives adverse influence to the orientation of the ferromagnetic powder in the magnetic recording layer. It is thought that the conventional ferromagnetic powder in the form of needle crystals is adversely effected by the adjacently existed globular abrasive in the orientation treatment. Thus, the ferromagnetic powder is likely dispersed non-uniformly in the recording layer.

Accordingly, improvement of the physical resistance of the magnetic recording layer is desired in a recording medium particularly using a ferromagnetic metal powder. Such improvement of the physical resistance of the magnetic recording layer is also desired in the conventional recording medium using such a ferromagnetic powder as an oxide-type powder of $\gamma$-$Fe_2O_3$, Co-containing ferromagnetic ferrite, or $CrO_2$.

SUMMARY OF THE INVENTION

It is an object of the present invention to provide an improved magnetic recording medium which is improved particularly with respect to the physical resistance of the magnetic recording layer as well as the electromagnetic conversion characteristics.

Especially, the invention has an object to provide an improved magnetic recording medium using a ferromagnetic metal powder which is improved particularly with respect to the physical resistance of the magnetic recording layer as well as the electromagnetic conversion characteristics.

There is provided by the present invention a magnetic recording medium comprising a nonmagnetic support and a magnetic recording layer provided on said support, said magnetic recording layer comprising a ferromagnetic powder dispersed in a binder, which is characterized in that said magnetic recording layer contains an acicular inorganic powder which has a Mohs' scale of hardness of not less than 5, a length of not longer than 1.0 $\mu$m, a thickness of not thicker than 0.1 $\mu$m, and an aspect ratio in the range of 5 to 20.

The present invention is favorably employable for a magnetic recording medium using a conventional ferromagnetic powder, but is more advantageously employable for a magnetic recording medium using a ferromagnetic metal powder of a specific surface area of not less than 42 $m^2/g$.

The recording layer of the magnetic recording medium of the invention shows an improved physical resistance. In more detail, the specific abrasive is more difficultly dropped off from the recording layer when the medium runs in contact with a magnetic head. Accordingly, the surface of the magnetic head can be kept under relatively clean conditions. Further, the magnetic recording medium of the invention shows less drop-out. Particularly, a magnetic recording medium of the invention in the form of a video-tape using a ferromagnetic metal powder shows an improved electromagnetic conversion characteristics such as an enhanced regeneration output. In the magnetic recording medium of the invention, the incorporation of an acicular inorganic powder serves to uniformly locate and orient the needle crystalline ferromagnetic powder, whereby enhancing the electromagnetic conversion characteristics.

DETAILED DESCRIPTION OF THE INVENTION

A magnetic recording medium of the invention comprises a nonmagnetic support and a magnetic recording layer provided on the support. The magnetic recording layer comprises a ferromagnetic powder dispersed in a binder.

There is no specific limitation on the nonmagnetic support employable in the present invention.

A material of the nonmagnetic support is not particularly limited and can be selected, for example, from polyethylene terephthalate, polypropylene, polycarbonate, polyethylene naphthalate, polyamide, polyamideimide, polyimide and metallic foils such as aluminum foil and stainless steel foil. The thickness of the support film generally is in the range of 3 to 50 $\mu$m and preferably in the range of 5 to 30 $\mu$m.

The nonmagnetic support may have a back layer (or backing layer) on the opposite side of the side where a magnetic recording layer is to be coated.

The magnetic recording medium of the invention has the above-described nonmagnetic support coated thereupon with a magnetic recording layer comprising a ferromagnetic powder dispersed in a binder.

The ferromagnetic powder employable in the invention is not particularly restricted and can be selected from, for example, $\gamma$-$Fe_2O_3$, $Fe_3O_4$, Co-modified iron oxide, metal powder containing iron atom as a major component, barium ferrite and strontium ferrite.

The present invention is particularly advantageous in the case of using a ferromagnetic metal powder which contains Fe, Co or Ni and has a specific surface area of not less than 42 $m^2$/g, because in such case the effect of the incorporation of the acicular hard inorganic powder is prominently observed.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powders are already known, and can be prepared by known methods.

The shape of the ferromagnetic powder normally used is needle (or acicular) shape, grain shape, dice shape, rice shape or plate shape. The size of ferromagnetic powder is normally not greater than 1 $\mu$m, and preferably not greater than 0.5 $\mu$m. In the case of using a ferromagnetic metal powder, its specific surface area ($S_{BET}$) preferably is not less than 42 $m^2$/g, and more preferably not less than 45 $m^2$/g.

The binder employable in the formation of the magnetic recording layer of the invention can be selected from known resins such as thermoplastic resins, thermosetting resins, and reactive resins. These resins can be employed singly or in combination.

Examples of the employable resins include cellulose derivatives (e.g. nitrocellulose and cellulose acetate), vinyl chloride/vinyl acetate copolymer resins, (e.g., vinyl chloride/vinyl acetate copolymers, vinyl chroride/vinyl acetate/vinylalcohol copolymers, and vinyl chloride/vinyl acetate/maleic acid anhydride copolymers), vinylidene chloride resins (e.g, vinylidene chloride/vinyl chloride copolymers, and vinylidene chloride/acrylonitrile copolymers), polyester resins (e.g., alkyd resin and linear polyester), acrylic resins (e.g., acrylic acid/acrylonitrile copolymer and methyl acrylate/acrylonitrile copolymer), polyvinyl acetal resin, polyvinyl resin, phenoxy resin, epoxy resin, butadiene/acrylonitrile copolymer resin, polyurethane resin and urethane epoxy resin.

If the above-mentioned resin is used with polyisocyanate compound as a binder, the magnetic recording layer of the invention can be more hardened. The polyisocyanate compounds which can be used are, for example, adducts of 3 moles of diisocyanate and 1 mole of trimethylol propane (e.g., tolylene diisocyanate, xylilene diisocyanate, hexamethylene diisocyanate), adducts of 3 moles of hexamethylene diisocyanate and buret, isocyanurate compounds of 5 moles of tolylene diisocyanate, isocyanurate adducts of 3 moles of tolylene diisocyanate and 2 moles of hexamethylene diisocyanate and polymer compounds of diphenylmethane diisocyanate.

The amount of the binder is generally in the range of 10 to 100 parts by weight and preferably in the range of 15 to 50 parts by weight per 100 parts by weight of the ferromagnetic powder.

It is necessary to include in the magnetic recording layer of the recording medium of the the invention an acicular hard inorganic powder (i.e., inorganic particles in the form of needle).

It has been confirmed that incorporation of the acicular inorganic powder as abrasive in the recording layer gives favorable effect to the orientation of the ferromagnetic powder in the layer. It is thought that since the acicular inorganic powder has a shape similar to the needle crystalline ferromagnetic powder, the acicular abrasive is easily arranged in parallel with the oriented ferromagnetic powder in the orientation operation. This means that the ferromagnetic powder is uniformly and densely dispersed in the recording layer. Accordingly, the resulting magnetic recording layer has an improved squareness ratio and shows improved electromagnetic conversion characteristics.

Further, the acicular abrasive (hard inorganic powder) oriented in the longitudinal direction of the tape-shaped medium in parallel with the oriented ferromagnetic powder serves for reinforcing the mechanical strength of the recording layer.

The acicular inorganic powder of the invention, which serves as abrasive has a length of not longer than 1.0 $\mu$m, a thickness of not thicker than 0.1 $\mu$m, and an aspect ratio (i.e., ratio of length/thickness) in the range of 5 to 20. The length of the acicular inorganic powder preferably is in the range of 0.1 to 0.95 $\mu$m. The thickness of the acicular inorganic powder preferably is in the range of 0.002 to 0.09 $\mu$m. The aspect ratio of the acicular inorganic powder preferably is in the range of 8 to 15. Acicular inorganic powders having dimensions excluded from the above range do not effectively serve for improving the desired characteristics.

In the invention, the values of length and thickness are expressed by average values for a great number of particles incorporated in the magnetic recording layer.

Material of the acicular inorganic powder employable in the invention should have a Mohs' scale of hardness of not less than 5. Examples of such hard material include $Cr_2O_3$(Mohs' scale of hardness: 9), $Al_2O_3$(9), $TiO_2$(6.5), $SiO_2$(7), $SnO_2$(7), and $\alpha$-$Fe_2O_3$ in the form of acicular powder. The acicular inorganic powder can be employed singly or in combination. Preferred material is a material having a Mohr's scale of hardness of not less than 8. Acicular $Cr_2O_3$ having Mohs' scale of hardness of 9 is particularly preferred.

The acicular inorganic powder can be prepared in known manners.

For instance, the preferred acicular $Cr_2O_3$ can be prepared in the following manner.

A mixture of $CrO_3$ and $Cr_2O_3$ is dispersed in water to give an aqueous slurry. The aqueous slurry is then placed in an autoclave and heated therein at 350° to 370° C. under a pressure of 300 to 500 atms. to give acicular $CrO_2$ particles. The acicular $CrO_2$ particles are heated at 700° to 900° C., preferably 800° to 850° C., in air to give the desired acicular $Cr_2O_3$ particles. The starting materials can be replaced with $Cr_2(CrO_4)_3$ which can be obtained by partial reduction of $CrO_3$.

The acicular inorganic powder of the invention is generally incorporated into the magnetic recording layer in an amount of not more than 10% by weight, preferably 0.1 to 8% by weight, more preferably 0.2 to 7% by weight based on the ferromagnetic powder incorporated in the recording layer. Incorporation of an excessive amount of the acicular inorganic powder may disturb the electromagnetic conversion characteristics. Too small amount of the acicular inorganic powder may not improve the physical resistance of the magnetic recording layer.

A magnetic recording medium of the invention can contain in the recording laye a known granular organic or inorganic filler in addition to the acicular inorganic powder. The granular filler may have a mean diameter in the range of 0.01 to 0.8 μm, preferably 0.06 to 0.4 μm. Examples of the granular filler include carbon black, graphite, tungsten disulfide, boron nitride, calcium carbonate, aluminum carbonate, iron oxide, titanium dioxide, magnesium oxide, zinc oxide, calcium oxide, lithopone, talc and other known abrasives. Carbon black having a mean diameter of 0.015 to 0.2 μm is particularly preferred.

The magnetic recording medium of the present invention can be produced by a process comprising the steps of first preparing a magnetic paint (or dispersion) containing the ferromagnetic powder, binder, acicular inorganic powder, and optional additives such as dispersing agent, lubricant, stabilizer and antistatic agent in an organic solvent such as methyl ethyl ketone or cyclohexane, and then applying thw magnetic point onto a nonmagnetic support, upon which the magnetic paint is processed to dryness. Generally, a magnetic recording layer is formed by applying the magnetic paint directly on a nonmagnetic support, but it is also possible to provide an adhesive layer or a subbing layer between the magnetic paint layer and the nonmagnetic support.

The dispersing agent employable is, for example, a fatty acid having 12 to 22 carbon atoms (e.g., caprylic acid, capric acid, lauric acid, myristic acid, palmitic acid, stearic acid, oleic acid, elaidic acid, linoleic acid, linolenic acid; a soap of an alkali metal (e.g., lithium, sodium or potassium) or an alkaline earth metal (e.g., magnesium, calcium or barium) of the above-stated fatty acid; a faatty acid amide derived from the fatty acid, an aliphatic amine, a higher alcohol, a polyalkyleneoxide alkylphosphate ester, an alkylphosphate ester, an alkylborate ester, a sarcosinate, an alkyl ether esters, or other known disperser or surfactant such as a trialkylpolyolefin quaternary ammonium salt and lecithin.

The lubricant is, for example, a fatty acid, a higher alcohol, a fatty acid ester of a monovalent fatty acid having 12 to 20 carbon atoms and a mono/polyhydric alcohol having 3 to 20 carbon atoms (e.g., butyl stearate or sorbitan oleate); a mineral oil, an animal or vegetable oil, an olefin polymer having a low molecular weight, an α-olefin polymer having low molecular weight, or other known lubricant, for instance, for plastics (e.g., graphite powder, molybdenum disulfide powder or teflon powder).

The antistatic agent, for example, a natural surfactant (e.g., saponin), a nonionic surfactant (e.g., of alkyleneoxide type, of glycerol type or of glycidol type), a cationic surfactant (e.g., higher alkylamine, quarternary ammonium salt, heterocyclic phosphonium compound such as pyridine or sulfonium compounds), an anionic surfactant (e.g., carboxylic acid, sulfonic acid, phosphate or compound having acid groups such as sulfuric ester-type or phosphoric ester type), and an amphoteric surfactant (e.g., amino acid, amino sulfonic acid, sulfuric or phosphoric ester of amino alcohol).

The magnetic paint is coated on the support to give a magnetic recording layer having generally a thickness of approx. 0.5 to 10 μm, preferably 1.5 to 7.0 μm (dry layer basis).

The coated layer is subjected to orientation treatment, and then dried. Generally, a smoothing treatment is applied to the coated layer at an appropriate stage. Thus processed composited sheet is then slitted to give magnetic recording media in the form of continuous tape.

The examples and the comparison examples of the present invention are given below. In the following examples, the expression "parts" means "parts by weight", otherwise specified.

EXAMPLE 1

Preparation of acicular $Cr_2O_3$ powder

A mixture of $CrO_3$ and $Cr_2O_3$ (in equal amounts to each other) was dispersed in water to give aqueous slurry. The aqueous slurry was then placed in an autoclave and heated therein to 350° C. under a pressure of 300 atm. for 5 hrs. to give acicular $CrO_2$ particles. The acicular $CrO_2$ particles were heated to 800° for 2 hrs. in air to give acicular $Cr_2O_3$ particles. The resulting acicular $Cr_2O_3$ particles were sieved to obtain a desired powder.

Preparation of magnetic recording tape

The components indicated below were mixed dispersely to give a magnetic paint.

| | |
|---|---|
| Ferromagnetic alloy powder (Fe—Ni alloy, Ni content: approx. 5 wt. %, specific surface area (S—BET): 45 m²/g) | 100 parts |
| Vinyl chloride/vinyl acetate/maleic acid anhydride copolymer (copolymerization ratio = 86:13:1, degree of polymerization: 400) | 12 parts |
| Polyurethane resin (N-2301, available from Japan Polyurethane Co., Ltd.) | 12 parts |
| Polyisocyanate (Colonate L, available from Japan Polyurethane Co., Ltd.) | 8 parts |
| Carbon black (particle size: 0.04 μm) | 1 part |
| Acicular inorganic powder (acicular $Cr_2O_3$ powder: length 0.3 μm, thickness 0.04 μm, aspect ratio 7.5) | 5 parts |

| -continued | |
|---|---|
| Methyl ethyl ketone | 300 parts |

The magnetic paint was coated on a polyethylene terephthalate film having the thickness of 10 μm so that the resultant layer would have the thickness of 3.0 μm (after being dried). While the layer was still wet, the layer was treated with an electromagnet to give a magnetic orientation. After the coated layer was dried, the dried layer was subjected to supercalendering in order to make the surface of the layer smooth. The sheet obtained was then slitted into a video tape (VHS type) having the width of ½ inch.

The resulting vide tape was evaluated on the magnetic characteristics by determining B-H curve (B: magnetic flux density, H: surounding magnetic field) and calculating a squareness ratio (Br/Bm, Br: maximum residual magnetic flux density, Bm: maximum magnetic flux density). The obtained squareness ratio was 0.83.

The video tape was repeatedly run at a half speed of the ordinary speed in contact with a ferrite head in a video-tape recorder (V-500D available from Toshiba Co., Ltd.). Then, the number of times at which the clogging of the magnetic head (namely, clogging times) was observed was detected. The video tape prepared as above gave no clogging on the magnetic head even after the video tape-running was repeated as many as 200 times.

In the above running procedure, the regeneration output (video output) was 5 dB at 1 μm. This value is a relative value based on that the regeneration output of Super HG-T-120 (tradename of a video tape of Fuji Photo Film Co., Ltd.) is 0 dB.

Further, the number of drop-out at 15 μs occurring in a minute was counted by means of a dropout counter VD-3D (available from Victor Company of Japan, Ltd.). The number of the drop-out was 4.

EXAMPLE 2

The procedure of Example 1 was repeated except that an acicular $Cr_2O_3$ powder having a length of 0.5 μm, thickness of 0.05 μm and aspect ratio of 10 was employed, to prepare a video tape.

The resulting video tape was examined in the same manner as described in Example 1.

The video tape prepared as above gave a squareness ratio of 0.83.

The video tape gave no clogging on the magnetic head even after the video tape-running was repeated as many as 200 times.

In the above running procedure, the regeneration output (video output) was 4.8 dB at 1 μm. The number of the drop-out was 4.

EXAMPLE 3

The procedure of Example 1 was repeated except that an acicular $Cr_2O_3$ powder having a length of 0.9 μm, thickness of 0.07 μm and aspect ratio of 12.9 was employed, to prepare a video tape.

The resulting video tape was examined in the same manner as described in Example 1.

The video tape prepared as above gave a squareness ratio of 0.83.

The video tape gave no clogging on the magnetic head even after the video tape-running was repeated as many as 200 times.

In the above running procedure, the regeneration output (video output) was 4.5 dB at 1 μm. The number of the drop-out was 5.

COMPARISON EXAMPLE 1

The procedure of Example 1 was repeated except that the acicular $Cr_2O_3$ powder was replaced with a globular $Cr_2O_3$ powder (diameter 0.3 μm) was employed, to prepare a video tape.

The resulting video tape was examined in the same manner as described in Example 1.

The video tape prepared as above gave a squareness ratio of 0.79.

The video tape gave clogging on the magnetic head even after the video tape-running was repeated as many as 100 times.

In the above running procedure, the regeneration output (video output) was 0 dB at 1 μm. The number of the drop-out was as many as 20.

COMPARISON EXAMPLE 2

The procedure of Example 1 was repeated except that the acicular $Cr_2O_3$ powder was replaced with a globular $Cr_2O_3$ powder (diameter 0.5 μm) was employed, to prepare a video tape.

The resulting video tape was examined in the same manner as described in Example 1.

The video tape prepared as above gave a squareness ratio of 0.79.

The video tape gave clogging on the magnetic head even after the video tape-running was repeated as many as 150 times.

In the above running procedure, the regeneration output (video output) was 4 dB at 1 μm. The number of the drop-out was as many as 15.

COMPARISON EXAMPLE 3

The procedure of Example 1 was repeated except that the acicular $Cr_2O_3$ powder was replaced with a globular $Al_2O_3$ powder (diameter 0.4 μm) was employed, to prepare a video tape.

The resulting video tape was examined in the same manner as described in Example 1.

The video tape prepared as above gave a squareness ratio of 0.80.

The video tape gave clogging on the magnetic head even after the video tape-running was repeated as many as 200 times.

In the above running procedure, the regeneration output (video output) was 1 dB at 1 μm. The number of the drop-out was as many as 4.

We claim:

1. In a magnetic recording medium comprising a nonmagnetic support and a magnetic recording layer provided on said support, said magnetic recording layer comprising a ferromagnetic powder dispersed in a binder, the improvement wherein said magnetic recording layer contains an acicular $Cr_2O_3$ powder having a length of not longer than 1.0 μm, a thickness of not thicker than 0.1 μm, and an aspect ratio of 5-20, wherein said acicular inorganic powder is contained in the recording layer in an amount of not more than 10% of weight of the ferromagnetic powder.

2. The magnetic recording medium as claimed in claim 1, wherein the length of said acicular inorganic powder is in the range of 0.1 to 0.95 μm.

3. The magnetic recording medium as claimed in claim 1, wherein the thickness of said acicular inorganic powder is in the range of 0.002 to 0.09 μm.

4. The magnetic recording medium as claimed in claim 1, wherein the aspect ratio of said acicular inorganic powder is in the range of 8 to 15.

5. The magnetic recording medium as claimed in claim 1, wherein said ferromagnetic powder is a ferromagnetic metal powder having a specific surface area of not less than 42 m$^2$/g.

* * * * *